United States Patent [19]

Ebihara

[11] 4,304,140

[45] Dec. 8, 1981

[54] STARTER

[75] Inventor: Kohei Ebihara, Katsuta, Japan

[73] Assignee: Hitachi, Ltd., Tokyo, Japan

[21] Appl. No.: 92,511

[22] Filed: Nov. 8, 1979

[30] Foreign Application Priority Data

Nov. 10, 1978 [JP] Japan .............................. 53-137958
Mar. 5, 1979 [JP] Japan .............................. 54-24454

[51] Int. Cl.[3] ...................... F02N 15/06; F16D 41/06

[52] U.S. Cl. ...................................... 74/7 R; 74/7 A; 192/45

[58] Field of Search ............... 74/6, 7 R, 7 A; 192/45

[56] References Cited

U.S. PATENT DOCUMENTS

| | | | |
|---|---|---|---|
| 3,087,591 | 4/1963 | Whitney et al. | 192/45 |
| 3,140,617 | 7/1964 | Palmer | 74/6 |
| 3,171,284 | 3/1965 | Scherzinger | 74/7 |
| 3,182,515 | 5/1965 | Klein | 74/7 |
| 3,820,406 | 6/1974 | Toulier | 74/6 |

*Primary Examiner*—Allan D. Herrmann
*Attorney, Agent, or Firm*—Craig and Antonelli

[57] ABSTRACT

A starter including a one-way clutch threadably connected to an output shaft of an electric motor and having an inner member, and a hollow pinion shaft having a pinion secured thereto and loosely fitted at its forward end portion in the inner member of the one-way clutch in such a manner that there is a slight clearance between the inner periphery of the inner member and the outer periphery of the hollow pinion shaft in connecting the inner member to the hollow pinion shaft. By this arrangement, the reaction produced by the pinion when the starter is actuated to start an engine is prevented from being directly transmitted to the inner member of the clutch to thereby inhibit an eccentric motion of the inner member of the clutch.

6 Claims, 9 Drawing Figures

STARTER

BACKGROUND OF THE INVENTION

This invention relates to starters in general and more particularly to a starter suitable for use in starting an internal combustion engine of an automotive vehicle.

A starter of the so-called cantilever pinion type includes a one-way clutch having an inner member and an outer member, the outer member being threadably connected to an output shaft of an electric motor driven by a rotor and the inner member being formed integrally with a hollow pinion shaft and slidably fitted in the output shaft of the electric motor, and a fixed frame supporting the outer periphery of the hollow pinion shaft by means of a bearing. This starter of the prior art has, as is well known from U.S. Pat. No. 3,171,284, been in use as a dust preventing type starter for various types of engines. This type of starter has a mechanism which best suits the condition of a dust preventing type starter, but its disadvantage is that since the hollow pinion shaft and the inner member of the clutch are formed integrally, the reaction produced in the pinion when the engine is started is transmitted to the inner member of the clutch, tending to cause tilting of the inner member. When this phenomenon happens, the inner member of the clutch becomes eccentric relative to the outer member thereof and the action of the clutch becomes unstable, so that the clutch is unable to function satisfactorily. In this type of starter, the hollow pinion shaft has an outer diameter greater than that of the pinion for facilitating assembling of the starter (generally, after the clutch is assembled, the clutch is fitted in the output shaft of the electric motor, and the output shaft is then inserted in the bearing from inside the fixed frame to be supported by the bearing). This necessarily results in the bearing having a larger inner diameter, causing an increase in the peripheral velocity of the pinion shaft and a loss of torque of the electric motor.

Meanwhile proposals have hitherto been made to adopt a construction in which the pinion is provided separately from the hollow pinion shaft to reduce the peripheral velocity of the pinion shaft or reduce the inner diameter of the bearing, so that the pinion will be attached to the pinion shaft after the starter is assembled. However, this construction is not successful when the pinion has a small root diameter because such pinion does not have sufficiently high strength.

SUMMARY OF THE INVENTION

This invention has as its object the provision of a starter for an internal combustion engine including a one-way clutch capable of functioning stably.

According to the invention, there is provided a starter of stable one-way clutch performance for an internal combustion engine comprising an output shaft of an electric motor for transmitting the rotational force of the electric motor to a pinion, a one-way clutch threadably connected to the outer periphery of the output shaft through a helical spline connection to prevent the motive force of the engine from being transmitted to the electric motor following starting of the engine, and a hollow pinion shaft for connecting an inner member of the one-way clutch to the pinion. The hollow pinion shaft is fitted in the inner member of the one-way clutch in such a manner that there is a very small clearance between the inner periphery of the inner member of the one-way clutch and the outer periphery of the forward end portion of the hollow pinion shaft when they are connected together, thereby avoiding direct transmission of the reaction produced in the pinion at the time of starting of the engine to the inner member of the one-way clutch.

In the embodiment of the invention described herein, the hollow pinion shaft has a small outer diameter to reduce the peripheral velocity of the pinion shaft within the bearing, and the outer periphery of the forward end portion of the hollow pinion shaft and the inner periphery of the inner member of the one-way clutch are connected to each other through an engaging member held in place by engaging grooves formed in the pinion shaft and the inner member of the one-way clutch to enable assembling and disassembling to be effected from the axial direction. Thus the pinion shaft can be kept in engagement with the inner member of the one-way clutch in normal engine operating condition and brought out of engagement therewith when an external force higher than a predetermined level is exerted thereon.

DESCRIPTION OF THE PREFERRED EMBODIMENT

Figure 1:
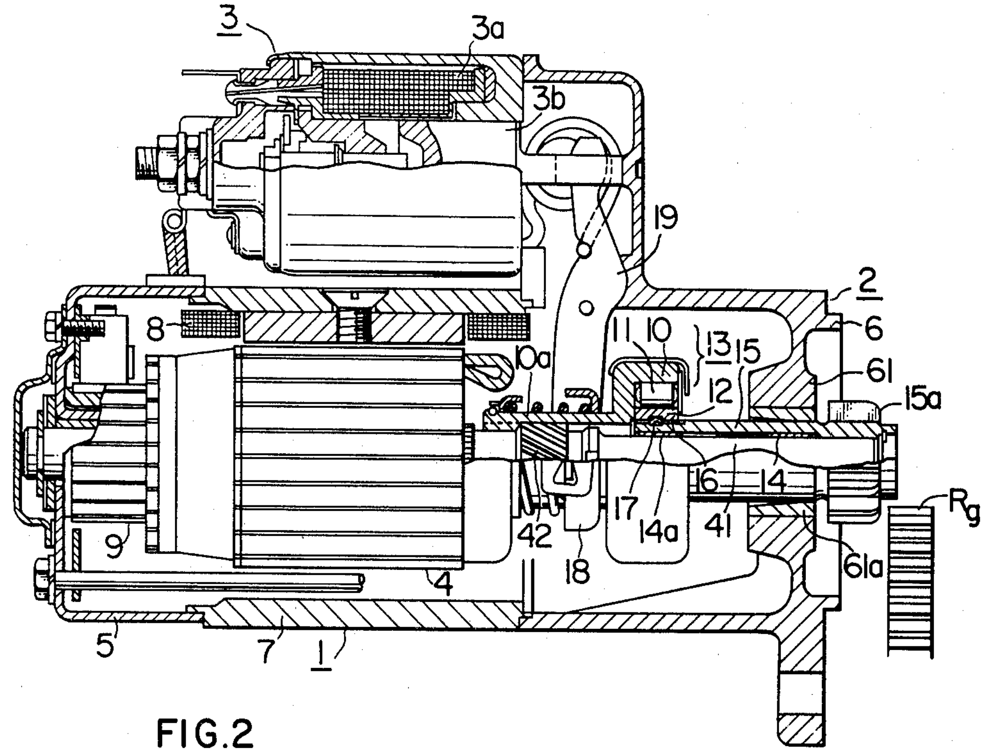
FIG. 1 is a vertical sectional view of the starter comprising one embodiment of the present invention.

FIG. 1 shows in a vertical sectional view the starter comprising one embodiment of the invention. The starter comprises an electric motor section 1, a pinion-clutch section 2 and a magnetic switch section 3. The electric motor section 1 includes a rotor 4 supported at one end by a rear cover (outer frame) 5 through a bearing and extending at the other end through a bearing portion 61 of a front bracket (outer frame) 6 of the pinion-clutch section 2 in the form of an output shaft 41 of the motor. The electric motor section 1 also includes an exciting portion 8 secured to a yoke 7 to excite the rotor 4. The numeral 9 designates a rectifier.

The pinion-clutch section 2 comprises a one-way roller clutch 13, and a hollow pinion shaft 15. The clutch 13 includes an outer member 10 and an inner member 12. The outer member 10 of the clutch 13 is provided with a cylindrical portion 10*a* formed with a male helical spline adapted to engage a female helical spline 42 formed on the output shaft 41, while the inner member 12 thereof engaging the outer member 10 through a stopper (roller) 11 is connected unitarily to the hollow pinion shaft 15 slidably fitted at its inner periphery to the outer periphery of the output shaft 41 through metal members 14 and 14*a* and journalled at its outer periphery by a bearing portion 61 formed at the front bracket 6. The hollow pinion shaft 15 has a pinion 15*a* secured to its forward end and is journalled by the bearing section 61 through a metal member 61*a* to facilitate sliding. The hollow pinion shaft 15 is loosely fitted at the outer periphery of the rear end portion thereof to the inner periphery of the inner member 12 of the clutch 13 through an engaging groove 16, so that the pinion shaft 15 is unitary with the inner member 12 of the clutch 13 in the direction of rotation and locked by an engaging member 17 in the axial direction. The cylindrical portion 10*a* of the outer member 10 of the clutch 13 has engaging therewith a sleeve 18 which in turn engages a shift lever 19 connected to a plunger 3*b* energized by a magnetic coil 3*a* for movement in the axial direction in reciprocatory movement.

Figure 2:
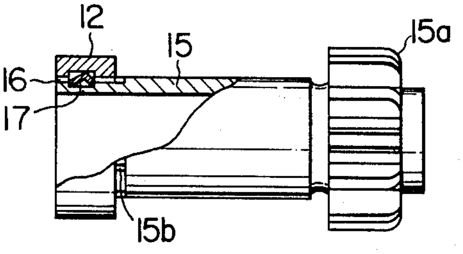
FIG. 2 is a sectional view of the essential portions of the starter shown in FIG. 1, showing the hollow pinion shaft in relation to the inner member of the one-way clutch.
Figure 3:
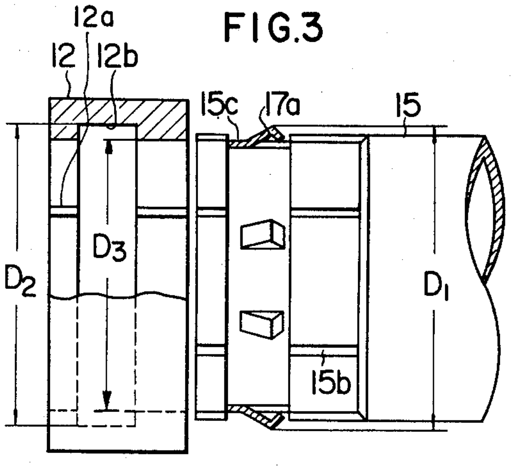
FIG. 3 is a sectional view, on an enlarged scale, of the essential portions of FIG. 2.
Figure 4:
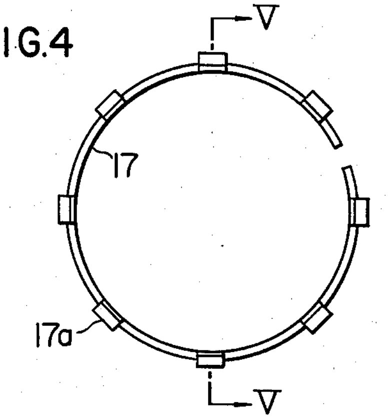
FIG. 4 is a front view, on an enlarged scale, of the engaging member shown in FIG. 2.
Figure 5:
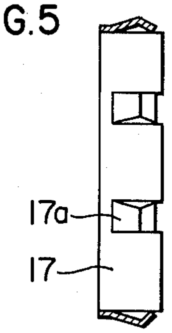
FIG. 5 is a sectional view taken along the line V—V in FIG. 4.

The structural relation between the hollow pinion shaft 15 and the inner member 12 of the clutch will be described by referring to FIGS. 2 and 3. As shown, the outer periphery of an end portion of the hollow pinion shaft 15 opposite the end portion at which the pinion 15*a* is supported is loosely fitted through the engaging groove 16 in the inner periphery of the inner member 12 of the clutch. More sepcifically, the hollow pinion shaft 15 is formed at its outer periphery with a plurality of connecting grooves 15*b* extending axially of the shaft 15 and an annular engaging groove 15*c* of a suitable width extending peripherally thereof. Meanwhile the inner member 12 of the clutch is formed at its inner periphery with a plurality of ribs 12*a* extending axially of the member 12 and located in positions corresponding to those of the connecting grooves 15*b* and with an annular engaging groove 12*a* extending peripherally thereof and having the substantially same width as the engaging groove 15*c*. The shaft 15 is loosely fitted in the inner member 12 as the ribs 12*a* are engaged in the corresponding connecting grooves 15*b* in such a manner that the clearance between the shaft 15 and inner member 12 is greater than the clearance between the shaft 15 and the metal bearing 14. With the hollow pinion shaft 15 being loosely fitted in the inner member 12 of the clutch, the peripherally extending engaging grooves 15*c* and 12*b* are located in spaced juxtaposed relation and the annular gap formed therebetween is filled by an engaging emmber 17 shown in FIGS. 4 and 5. By this arrangement, the shaft 15 and inner member 12 are interconnected in such a manner that wobbling of the shaft 15 in the radial direction and dislodging thereof in the axial direction can be avoided. The engaging member 17 is formed of a resilient steel sheet and shaped as a ring with a cutout. The engaging member 17 has formed at its outer periphery with a plurality of claws 17*a* projecting outwardly in angled form. The diameter $D_1$ of the engaging member measured at the crests of the claws 17*a* is greater than the inner diameter $D_2$ of the engaging groove 12*b* formed in the inner member 12 of the clutch, and the engaging member 17 is produced by working a steel sheet by means of a press and by bending.

The pinion-clutch section 2 constructed as aforesaid is assembled as follows. The one-way clutch 13 is fitted over the output shaft 41 of the electric motor through the spline connection. The output shaft 41 may be of the type which has the rotation of the rotor shaft transmitted thereto by reducing speed. The one-way clutch 13 is connected by the shift lever 19 to the plunger 4*b* of the magnetic switch 3, and the front bracket 6 is connected to the pinion-clutch section 2 in such a manner that the forward end of the output shaft 41 extends outwardly through the bearing section 61. Then the forward end of the output shaft 41 is inserted in an open end (opposite the pinion 15*a*) of the hollow pinion shaft 15 so that the output shaft 41 is supported by the hollow pinion shaft 15 and the pinion shaft 15 is journalled by the bearing 61*a* to keep the shafts 41 and 15 in concentric relation. The hollow pinion shaft 15 extending up to the inner member 12 of the clutch has its connecting grooves 15*b* positioned with the ribs 12*a* formed in the inner member 12. Further movement of the hollow pinion shaft 15 into the inner member 12 of the clutch brings the claws 17*a* of the engaging member 17 into contact with an inner diameter portion $D_3$ of the inner member 12, and the claws 17*a* are deformed by their tapering and withdrawn downwardly. After the claws 17*a* have completely passed through the inner diameter portion $D_3$, the claws 17*a* are restored to their original shape as they reach the engaging groove 12*b*, so that the hollow pinion shaft 15 is maintained in engagement with the inner member 12 of the clutch. In this condition, the inner diameter $D_2$ of the engaging groove 12*a* and the diameter $D_1$ of the crests of the claws 17*a* are in the relation $D_1 > D_2$ so that the shaft 15 is in tight engagment with the inner member 12 with an interference therebetween. The force with which the shaft 15 engages the inner member 12 through the engaging member 17 is about 10 kg which is enough for a starter of the class of 1 kw because the dislodging preventing load in this class of starter is about 9 kg including the safety factor.

In operation, energization of the coil 3*a* of the magnetic switch 3 actuates the plunger 3*b* to transmit the force of movement to the one-way clutch 13 through the shift lever 19 and the sleeve 18 of the one-way clutch 13. This causes the hollow pinion shaft 15 supporting the clutch 13 and pinion 15*a* to move in sliding movement on the output shaft 41 while rotating along the helical spline, to thereby bring the pinion 15*a* into meshing engagement with a ring gear Rg of the engine. At this time, the electric motor section 1 is energized to rotate the rotor 4 whose rotation is transmitted through the output shaft 41, one-way clutch 13 and pinion 15*a* to the ring gear Rg to drive the same for starting the engine. The reaction produced in the pinion 15*a* in meshing engagement with the ring gear Rg when the force is transmitted to the engine is borne by the metal bearing 61*a* at the outer peripheral portion of the hollow pinion shaft 15. However, the reaction might manifest itself as eccentricity at the inner peripheral portion of the shaft 15 within the scope of the clearance produced by the tolerance provided in fitting the shaft 15 in the metal bearings 14 and 14*a*, so that an offset load might be applied to the inner member 12 of the clutch 13.

However, according to the invention, the inner member 12 of the clutch and the hollow pinion shaft 15 are formed separately from each other and fitted one into the other in such a manner that a shock absorbing clearance larger than the clearance (the aforesaid tolerance) between the metal bearings 14 and 14*a* and the hollow pinion shaft 15 is provided between the inner member 12 and the shaft 15, with a result that the offset load is absorbed by the shock absorbing clearance and no eccentricity of the inner member 12 of the clutch occurs.

In the embodiment shown and described hereinabove, the starter is highly reliable in performance because the one-way clutch 13 functions stably at all times even if the reaction produced in the pinion 15 is applied thereto. Also, it is possible to reduce the diameter of the hollow pinion shaft 15, so that as compared with starters of the prior art the starter according to the invention is capable of increasing the durability of its bearings and reducing a loss of power by reducing the peripheral velocity of the pinion shaft at the same number of revolutions and a loss of torque at the same load. An added advantage is that the starter according to the invention can be readily attached and removed and can be readily inspected and maintained because the hollow pinion shaft 15 and the inner member 12 of the clutch are prevented from rotating relative to each other by the connecting grooves 15*b* and the ribs 12*a* and from moving axially by the resilience of the engaging member 17 fitted in the engaging grooves 12*b* and 15*c* extending peripherally.

Figure 6:
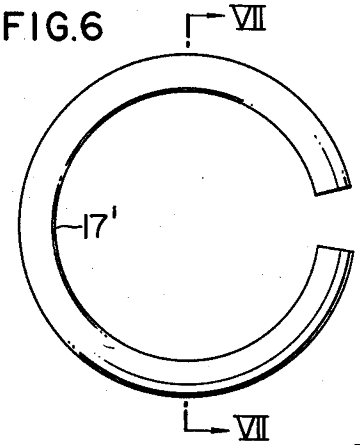
FIG. 6 is a front view, on an enlarged scale, of the engaging member of the starter of a modified form.
Figure 7:
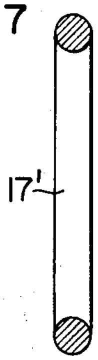
FIG. 7 is a sectional view taken along the line VII—VII in FIG. 6.

In the embodiment shown and described hereinabove, the engaging member 17 is in the form of a ring with a cutout formed with claws. However, the invention is not limited to this specific form of the engaging member and that a wire ring 17' shown in FIGS. 6 and 7 may be used instead. The wire ring can be readily produced and achieve the same effects when fitted in either one of the engaging grooves.

The claws of the engaging member 17 may be provided either on the outer periphery or on the inner pheriphery of the ring-shaped member. The engaging member may be fitted in either one of the engaging grooves depending on the position of the claws. In place of using the ring-shaped member, the claws may be formed as separate entities and adhesively attached to the engaging groove or grooves formed in the entire periphery of the shaft 15 and the inner member 12 of the clutch.

Figure 8:
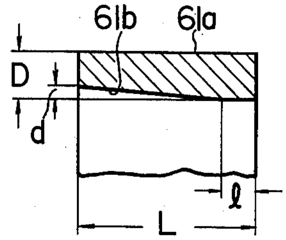
FIG. 8 is a view, on an enlarged scale, of the metal bearing shown in FIG. 1.

FIG. 8 shows the metal bearing 61*a* in detail. As shown, the metal bearing 61*a* is formed at its inner periphery with a tapering surface portion 61*b* contiguous with a straight surface portion of a length l disposed on the axially outer side. Preferably, the tapering surface portion 61*b* is angled such that its angle of inclination is greater than the angle of inclination of the hollow pinion shaft 15.

Figure 9:
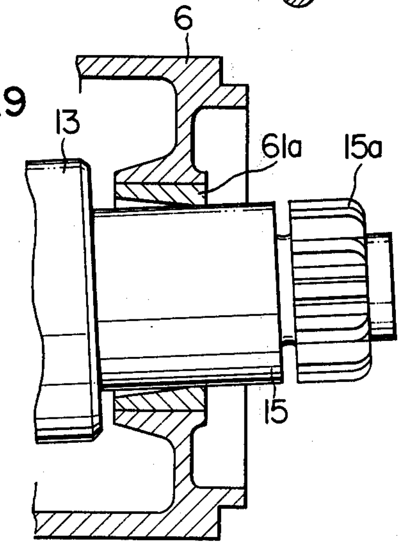
FIG. 9 is a view, on an enlarged scale, of the bearing section shown in FIG. 1, in explanation of the movement of the hollow pinion shaft.

The use of the metal bearing 61*a* of the type having the tapering surface portoin 61*b* at its inner periphery has the effect of avoiding a pinching phenomenon because the tapering surface portion 61*b* is prevented from coming into contact with the hollow pinion shaft 15 even if the pinion 15*a* is tilted and causes the shaft 15 to tilt as shown in FIG. 9. When the tapering surface portion 61*b* formed at the left end portion of the inner periphery of the metal bearing 61*a* of a length $L=15$ mm and a thickness $D=4$ mm had a maximum spacing of $d=0.2$ mm between it and an extension of the straight surface portion at the right end portion of the metal bearing 61*a* which had a length of $l=4$ mm as shown in FIG. 8, excellent results were achieved because no pinching occurred even when the pinion 15*a* was tilted.

What is claimed is:

1. A starter for an internal combustion engine comprising:

an output shaft driven by a rotor of an electric motor;

an outer member of a one-way clutch in engagement with the outer periphery of said output shaft through a spline connection for axial movement;

an inner member of said one-way clutch engaging said outer member through a stop for transmitting a rotary force to a hollow pinion shaft slidably fitted over said output shaft;

a pinion secured to the forward end of said hollow pinion shaft for starting said internal combustion engine; and bearing means secured to a fixed frame for journalling the hollow pinion shaft at its outer periphery; wherein the improvement resides in that an end portion of said hollow pinion shaft opposite the forward end is formed separately from said inner member of said one-way clutch in such a manner that there is a very small radial clearance therebetween, said opposite end portion being formed with connecting means for avoiding relative rotation with respect to said inner member and engaging means for avoiding axial dislodgement of the pinion shaft from said inner member, whereby offsets applied to said pinion shaft can be absorbed without transmission thereof to said inner member.

2. A starter as claimed in claim 1, wherein said very small radial clearance between said inner member of said one-way clutch and said hollow pinion shaft is greater than the clearance formed at least between the hollow pinion shaft and a bearing interposed between the output shaft and the hollow pinion shaft.

3. A starter for an internal combustion engine comprising:

an output shaft driven by a rotor of an electric motor;

an outer member of a one-way clutch in engagement with the outer periphery of said output shaft through a spline connection for axial movement, an inner member of said one-way clutch engaging said outer member through a stop for transmitting a rotary force to a hollow pinion shaft slidably fitted over said output shaft;

a pinion secured to the forward end of said hollow pinion shaft for starting said internal combustion engine; and bearing means secured to a fixed frame for journalling the hollow pinion shaft at its outer periphery; wherein the improvement resides in that said hollow pinion shaft is formed separately from said inner member of said one-way clutch and fitted in said inner member of said one-way clutch in such a manner that there is a very small radial clearance therebetween, wherein said inner member of said one-way clutch is formed with a peripherally extending annular groove on its inner periphery and said hollow pinion shaft is formed with a peripherally extending annular groove on its outer periphery located in spaced juxtaposed relation to the inner periphery of said inner member of said one-way clutch, and an engaging member is fitted in either one of said annular grooves to avoid axial dislodging of said hollow pinion shaft.

4. A starter as claimed in claim 3, wherein said engaging member is a radially extending ring with a cutout therein.

5. A starter as claimed in claim 3, wherein said engaging member is a ring with a cutout therein having claws on its outer periphery.

6. A starter for an internal combustion engine comprising:

an output shaft driven by a rotor of an electric motor;

an outer member of a one-way clutch in engagement with the outer periphery of said output shaft through a spline connection for axial movement, an inner member of said one-way clutch engaging said outer member through a stop for transmitting a rotary force to a hollow pinion shaft slidably fitted over said output shaft;

a pinion secured to the forward end of said hollow pinion shaft for starting said internal combustion engine; and bearing means secured to a fixed frame for journalling the hollow pinion shaft at its outer periphery; when the improvement resides in that said hollow pinion shaft is formed separately from said inner member of said one-way clutch and fitted in said inner member of said one-way clutch in such a manner that there is a very small radial clearance therebetween, wherein said bearing means for journalling said hollow pinion shaft at its outer periphery is formed on its inner periphery with a tapering surface portion and a straight surface portion.

* * * * *